US012808670B2

(12) United States Patent
Oida

(10) Patent No.: US 12,808,670 B2
(45) Date of Patent: Nov. 24, 2026

(54) AERIAL VEHICLE POSITION ESTIMATION SYSTEM AND AERIAL VEHICLE POSITION ESTIMATION METHOD

(71) Applicant: Fukuoka Institute of Technology, Fukuoka (JP)

(72) Inventor: Kazumasa Oida, Fukuoka (JP)

(73) Assignee: Fukuoka Institute of Technology, Fukuoka (JP)

(*) Notice: Subject to any disclaimer, the term of this patent is extended or adjusted under 35 U.S.C. 154(b) by 62 days.

(21) Appl. No.: 18/924,269

(22) Filed: Oct. 23, 2024

(65) Prior Publication Data

US 2026/0110539 A1 Apr. 23, 2026

(51) Int. Cl.
*G01S 19/51* (2010.01)
*G01C 21/12* (2006.01)

(52) U.S. Cl.
CPC .................................... *G01C 21/12* (2013.01)

(58) Field of Classification Search
CPC ......... G01S 19/42; G01S 19/51; G01C 21/12; G05D 1/245
See application file for complete search history.

(56) References Cited

U.S. PATENT DOCUMENTS 9,355,562 B1 * 5/2016 Ferguson ............. G05D 1/0214
12,394,515 B1 * 8/2025 Eskander ............... G16H 40/20
12,525,025 B1 * 1/2026 Burlina .................. G06V 20/58
12,555,043 B2 * 2/2026 Pronovost .............. G06N 20/00
2021/0373580 A1 * 12/2021 Morales Delgado .... G08G 5/55
2022/0250508 A1 * 8/2022 Donovan ............. B60L 3/0046

FOREIGN PATENT DOCUMENTS

CN 114239376 A * 3/2022 ............. G06F 30/27
CN 118230007 A * 6/2024 ............. G06V 10/82
JP 2019-079088 A 5/2019
JP 2019-121967 A 7/2019
JP 2020-176961 A 10/2020
JP 2022-152525 A 10/2022

* cited by examiner

*Primary Examiner* — Donald J Wallace
*Assistant Examiner* — Alex B Griffin
(74) *Attorney, Agent, or Firm* — Muncy, Geissler, Olds & Lowe, P.C.

(57) ABSTRACT

An aerial vehicle position estimation system 20 estimates the current position of an aerial vehicle 10 by executing a machine learning model N using time-series data related to the aerial vehicle 10 flying in a predetermined flight route as an input value. The machine learning model N is composed of an input cross-attention layer C1, a self-attention layer S, and an output cross-attention layer C2, and has a function of using the time-series data as an input value as first array data D1 and reconstructing the first array data based on predetermined weighting coefficients to generate second array data D2.

10 Claims, 6 Drawing Sheets

( a )

```
1. arm_and_takeoff(5)
2. time.sleep(10)
3. send_local_ned_velocity(5,0,0,2)
4. time.sleep(5)
5. send_local_ned_velocity(1,3,1,2)
6. time.sleep(5)
7. vehicle.close()
```

Inverse conversion ( b )

AERIAL VEHICLE POSITION ESTIMATION SYSTEM AND AERIAL VEHICLE POSITION ESTIMATION METHOD

TECHNICAL FIELD

The present invention relates to an aerial vehicle position estimation system and an aerial vehicle position estimation method. Specifically, the present invention relates to an aerial vehicle position estimation system and an aerial vehicle position estimation method that can improve the accuracy of estimating the current position of an aerial vehicle and allow the aerial vehicle to fly stably for a long time.

DESCRIPTION OF THE RELATED ART

An unmanned aerial vehicle such as an unmanned aircraft or a drone needs to obtain the current position of the own device during flight in real time in order to ensure safety in autonomous flight. In order to obtain the current position of the unmanned aerial vehicle, for example, adopted is a method of receiving a GPS signal sent from an artificial satellite by a GPS device mounted on the unmanned aerial vehicle, or a method of calculating a flight route from a starting point by combining vectors of travel distance and direction for each subdivision point based on an inertial navigation system including an acceleration sensor and a gyro sensor mounted on the unmanned aerial vehicle.

However, the GPS device cannot stably obtain position information in an environment where a GPS signal is difficult to reach, such as under a bridge or the inside of a building. Further, the inertial navigation system has large error accumulation with increasing travel distance, and a flight distance over which safe flight can be maintained is limited.

Therefore, in order to safely fly the unmanned aerial vehicle for a long time in such an environment, it is necessary for a human to visually monitor the unmanned aerial vehicle during the flight. Further, when autonomous flight or automatic control is difficult, it is necessary to switch to manual remote control to assist the flight. However, in the case of human monitoring or piloting, it places a heavy burden on the operator and can cause a serious accident due to oversight or erroneous piloting due to human error. Consequently, various techniques for making it possible to obtain the accurate current position of the unmanned aerial vehicle have been proposed.

For example, Patent Document 1 discloses a system that grasps the current flight position based on an object captured by an imaging device mounted on an unmanned aerial vehicle. Specifically, a reference object imaged at a reference position is compared with a measured object imaged at a measured position, and a three-dimensional displacement of the measured position from the reference position is detected based on a two-dimensional positional deviation and a three-dimensional angular deviation, thereby estimating the current position of the own device.

PRIOR ART DOCUMENT

Patent Document

[Patent Document 1] Japanese Unexamined Patent Application Publication No. 2020-176961

SUMMARY OF THE INVENTION

Problem to be Solved by the Invention

According to Patent Document 1 described above, the flight position of the own device can be grasped even in an environment where a GPS signal is difficult to reach, and no errors associated with travel distance occur unlike the inertial navigation system, so that the position of the own device can be stably grasped at all times even during a long flight.

However, when the flight position of the own device is obtained based on the image captured by the imaging device, computation for image processing is required, and the computational load and the computation time become long. Along with this, the battery consumption of the unmanned aerial vehicle also increases, which also limits the flight time.

The present invention has been made in view of the foregoing points, and an object thereof is to provide an aerial vehicle position estimation system and an aerial vehicle position estimation method that can improve the accuracy of estimating the current position of an aerial vehicle and allow the aerial vehicle to fly stably for a long time.

Means for Solving the Problem

In order to achieve the foregoing object, an aerial vehicle position estimation system of the present invention includes a communication unit capable of receiving time-series data related to an aerial vehicle flying in a predetermined route by wireless communication, and an estimation unit that estimates a current flight position of the aerial vehicle by executing a predetermined machine learning algorithm using the time-series data received by the communication unit as an input value.

Here, by including the communication unit capable of receiving time-series data related to the aerial vehicle flying in a predetermined route by wireless communication, the time-series data indicating a flight state of the aerial vehicle can be received via wireless communication.

Further, by including the estimation unit that estimates the current flight position of the aerial vehicle by executing a predetermined machine learning algorithm using the time-series data received by the communication unit as an input value, the current position of the aerial vehicle can be accurately grasped with a small computational load based on past learned data.

Further, when the estimation unit generates array data obtained by reconstructing the time-series data based on predetermined weighting coefficients, the estimation unit can reconstruct the time-series data as array data that is noteworthy for estimating the current position of the aerial vehicle.

Further, when the estimation unit has an input layer that generates first array data obtained by compressing the input value based on predetermined weighting coefficients, the input layer can compress the input value into array data for which features are extracted from the time-series data of the aerial vehicle. Therefore, it is not necessary to compute interactions between all time points in the time-series data, and the memory amount and the computation amount for the computation can be reduced.

Further, when the estimation unit has an intermediate layer that reconstructs the first array data to generate second array data, the estimation unit can further optimize the noteworthy time-series data among the first array data compressed in the input layer. More specifically, the estimation unit can learn correlation between the time-series data included in the first array data and reconstruct the time-series data into highly correlated time-series data.

Further, when the estimation unit has an output layer that converts the second array data into an output value having a size equal to the input value, the estimation unit can output the time-series data compressed in the input layer as time-series data having the same size as the input value and characterized by learning. Then, the current position of the aerial vehicle can be accurately estimated based on the time-series data output by the output layer.

Further, when the input layer and the output layer each execute cross-attention processing using a cross-attention mechanism, first, in the input layer, the computational load by the machine learning algorithm can be reduced by compressing the input value into data of a predetermined size. Further, in the output layer, the data learned by the machine learning algorithm can be output as time-series data of the original size.

When self-attention processing using a self-attention mechanism is executed in the intermediate layer a plurality of times, the intermediate layer can optimize the time-series data by repeating the self-attention processing and capture characteristic data necessary for estimating the current position of the aerial vehicle, so that the accuracy of estimating the current position of the aerial vehicle can be improved.

Further, when the input layer generates the first array data by mapping a byte array based on the input value with a latent array having a smaller number of data points than the byte array, the time-series data can be compressed into array data characterized based on the latent array determined by random numbers.

Further, when the wireless communication is based on a low power wide area (LPWA) system, LPWA is a long-distance data communication with low power consumption, so that the battery consumption in data transmission and reception of the aerial vehicle is small, and the flight time and the flight distance of the aerial vehicle can be extended.

Further, when the time-series data includes a roll angle, a pitch angle, a yaw angle, and an altitude of the aerial vehicle, the current position of the aerial vehicle can be accurately estimated based on these parameters.

Further, when the machine learning algorithm is Perceiver or Transformer, it can perform learning of long-term dependencies with long-term time-series data without being affected by past learning data. Furthermore, the computational load can be reduced by adopting Perceiver.

In order to achieve the foregoing object, an aerial vehicle position estimation method of the present invention includes the steps of receiving time-series data related to an aerial vehicle flying in a predetermined route by wireless communication, and estimating a current position of the aerial vehicle by executing a predetermined machine learning algorithm using the received time-series data as an input data.

Through the above steps, the current position of the aerial vehicle can be accurately grasped with a small computational load based on the learned data using the time-series data of the aerial vehicle as an input value.

Further, by having a step of comparing the current position of the aerial vehicle with a predetermined flight route and controlling the aerial vehicle by autonomous control or an external control signal so as to return to the flight route when the current position of the aerial vehicle deviates from the flight route, the aerial vehicle can be caused to always fly along the correct flight route.

Advantageous Effects of the Invention

The aerial vehicle position estimation system and the aerial vehicle position estimation method according to the present invention can improve the accuracy of estimating the current position of the aerial vehicle and allow the aerial vehicle to fly stably for a long time.

MODES FOR CARRYING OUT THE INVENTION

Hereinafter, an aerial vehicle position estimation system and an aerial vehicle position estimation method according to an embodiment of the present invention will be described in detail with reference to the accompanying drawings and provided for understanding of the present invention.

Figure 1:
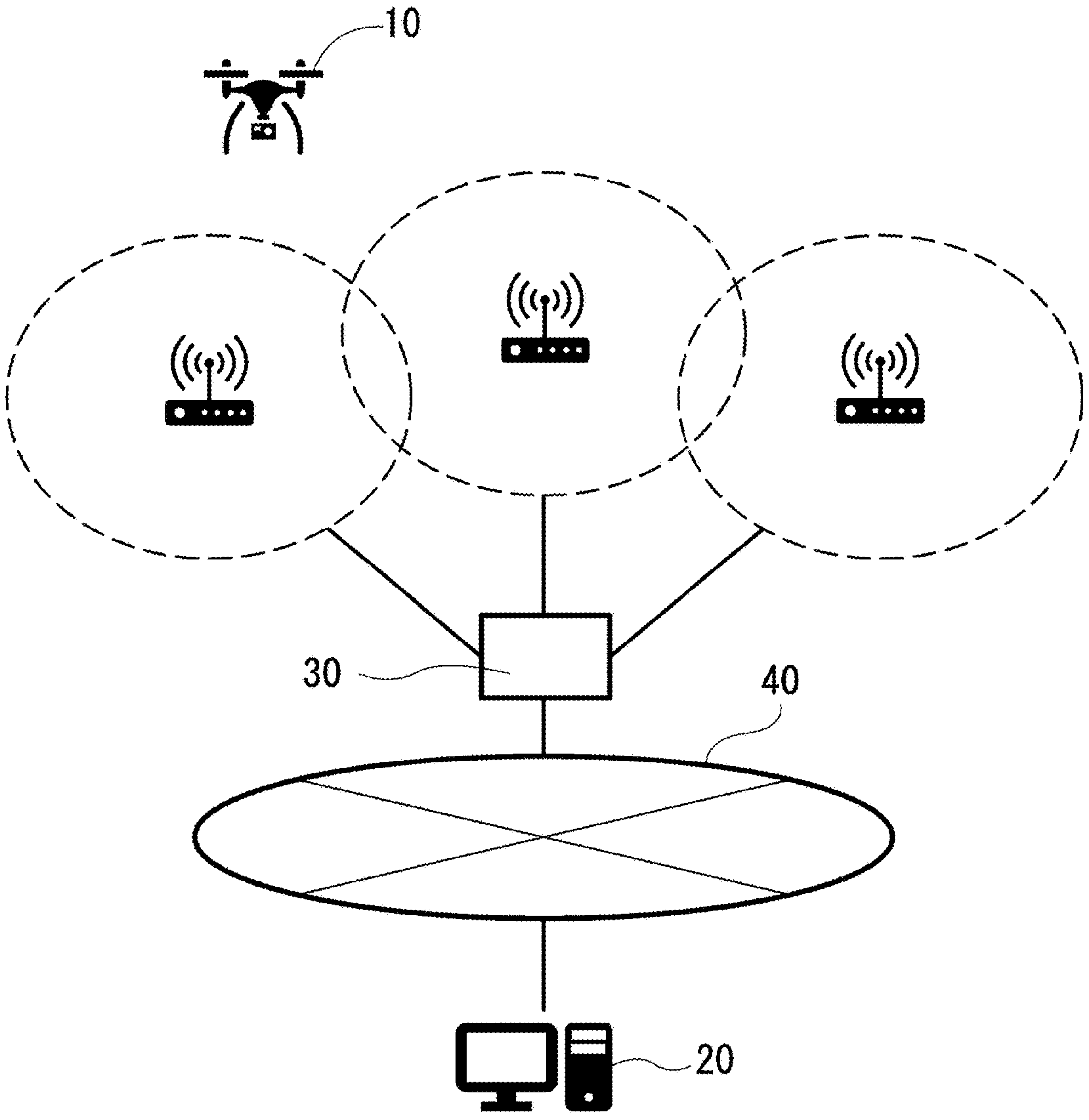
FIG. 1 is a schematic diagram of an entire network configuration including an aerial vehicle position estimation system according to an embodiment of the present invention.

FIG. 1 is a schematic diagram of an entire network configuration according to an embodiment of the present invention. In the present embodiment, an aerial vehicle 10 flies within a low power wide area (LPWA) network, and the aerial vehicle 10 and a position estimation system 20 can communicate with each other by a network 40 via an LPWA gateway 30.

The LPWA network is a network for which a specified low power radio station is used as a base station, and for example, standards such as SIGFOX, LoRa (LoRa WAN), Wi-Fi HaLow, Wi-SUN, RPMA, Flexnet, IM920, Cat.M1, Cat.NB1, and the like can be appropriately applied.

Note that the communication method between the aerial vehicle 10 and the position estimation system 20 is not necessarily limited to LPWA and can be appropriately selected from publicly known communication methods. However, LPWA is long-distance data communication with low power consumption, and the battery consumption of the aerial vehicle 10 is small in data transmission and reception between the aerial vehicle 10 and the position estimation system 20, so that the flight time and the flight distance of the aerial vehicle 10 can be extended.

[Aerial Vehicle]

Figure 2:
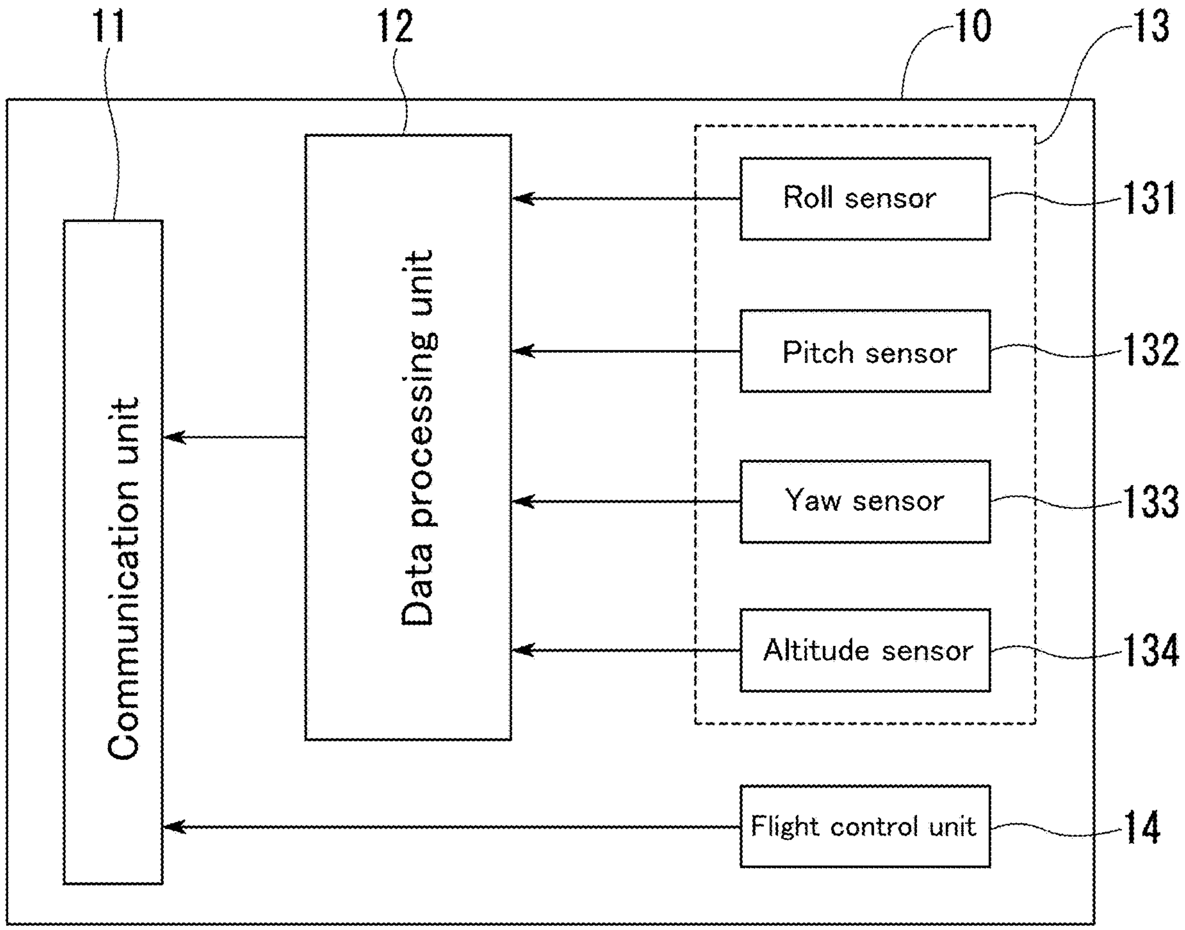
FIG. 2 is a block diagram showing a hardware configuration of the aerial vehicle according to the embodiment of the present invention.

The aerial vehicle 10 of the present embodiment is an unmanned aerial vehicle that flies by remote control or autopilot, and is, for example, a drone, a multicopter, an unmanned aircraft, or the like. As shown in the block diagram of FIG. 2, the aerial vehicle 10 is composed of a communication unit 11, a data processing unit 12, a sensor unit 13, and a flight control unit 14.

The communication unit 11 has a function of connecting the aerial vehicle 10 to the LPWA network and transmitting and receiving data and control signals to and from the position estimation system 20 via the network 40.

The sensor unit 13 is a sensor for detecting a flight state of the aerial vehicle 10, and mainly includes a roll sensor 131 for measuring the angular velocity in the roll direction, a pitch sensor 132 for measuring the angular velocity in the pitch direction, a yaw sensor 133 for measuring the angular velocity in the yaw direction, and an altitude sensor 134 for measuring the altitude. During the flight of the aerial vehicle 10, the sensor unit 13 measures time-series data related to the flight of the aerial vehicle 10. The time-series data measured by the sensor unit 13 is then input to the data processing unit 12, is subjected to various kinds of processing, and then is output from the communication unit 11 to the position estimation system 20. In addition, a throttle sensor may be used instead of the altitude sensor 134.

The flight control unit 14 outputs a control signal to a power mechanism of the aerial vehicle 10 in order to fly the aerial vehicle 10 according to a predetermined flight route. Further, the flight control unit 14 has a function of outputting a control signal to the power mechanism based on an external control signal in the event of an abnormal situation in which the aerial vehicle 10 needs to make an emergency landing due to a system failure or a cyberattack, or a situation in which the aerial vehicle 10 has deviated from the flight route and needs to be returned to the correct flight route.

[Position Estimation System]

Figure 3:
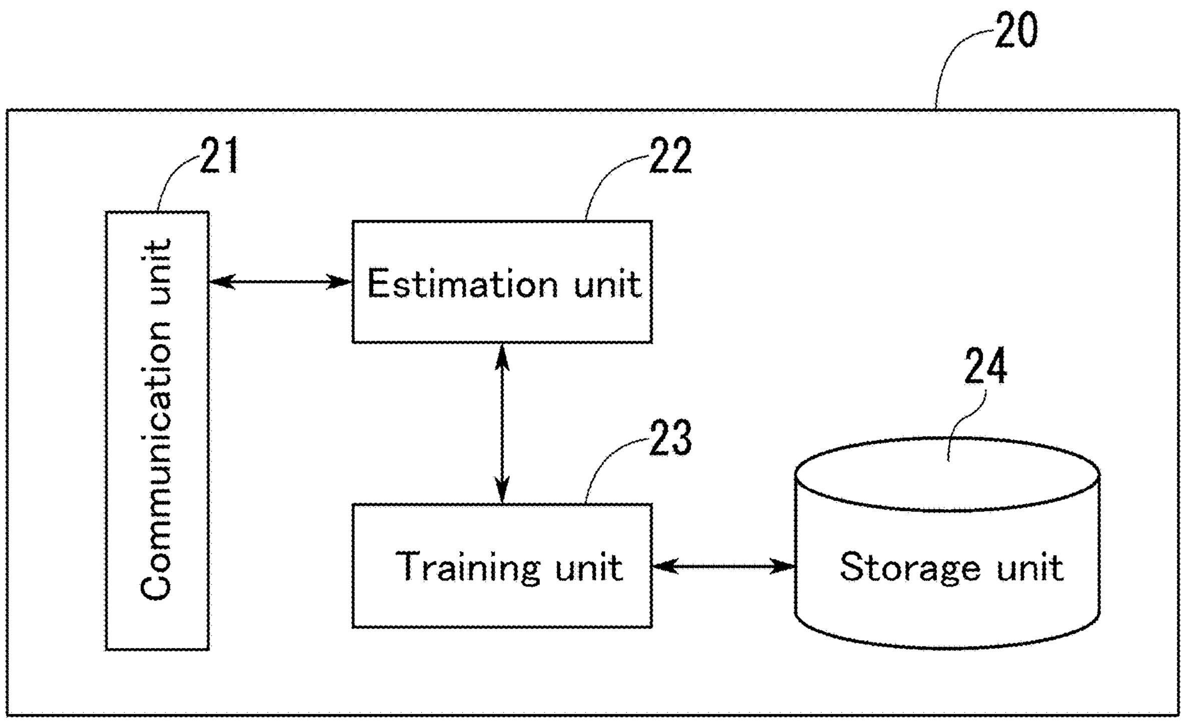
FIG. 3 is a block diagram showing a hardware configuration of an estimation unit according to the embodiment of the present invention.

The position estimation system 20 has a function of estimating the current position of the aerial vehicle 10 based on the time-series data related to the flight transmitted from the aerial vehicle 10 flying in the flight route. The position estimation system 20 is composed of a computer device having a CPU, a memory, and the like, and as shown in the block diagram of FIG. 3, is composed of a communication unit 21 that receives radio waves, an estimation unit 22 that estimates the current position of the aerial vehicle 10 based on a machine learning model using the time-series data of the aerial vehicle received by the communication unit 21 as an input value, and a training unit 23 that trains the machine learning model based on training data stored in a storage unit 24.

The machine learning model N applied in the estimation unit 22 of the embodiment of the present invention is a mathematical model that predicts the current position of the aerial vehicle 10 using the time-series data of the aerial vehicle 10 as an input value. Specifically, Perceiver is used as the machine learning model.

Here, the machine learning model N applied in the estimation unit 22 is not necessarily limited to Perceiver and can be appropriately selected from publicly known machine learning models such as a long short-term memory (LSTM) model, a convolutional neural network (CNN), and Transformer.

However, when the time-series data of the aerial vehicle 10 is used as the input value as in the present invention, it is conceivable that the flight direction of the aerial vehicle 10 may be changed after an elapse of a long time. Therefore, it is preferable to select a machine learning model that can capture long-term dependencies and has a small computational load.

In this regard, LSTM is heavily influenced by the past, so that it cannot capture long-term dependencies and the error of the output value increases. Further, the computation amount also becomes enormous, so that a large amount of memory is required. Further, CNN captures local events and is not suitable for capturing long-term dependencies. On the other hand, Transformer is less prone to errors like LSTM and CNN but computes all interactions in the input time-series data, so that a large amount of memory and a large amount of computation are required when handling long hours of time-series data.

On the contrary, the basic concept of the machine learning model of Perceiver is similar to that of Transformer, but Perceiver computes interactions in compressed time-series data. Thus, even if the time-series data becomes long, a large amount of memory or a large amount of computation is not required as compared with Transformer. Accordingly, it is preferable to apply Perceiver from the viewpoint of capturing long-term dependencies and reducing the computational load and memory size.

Figure 4:
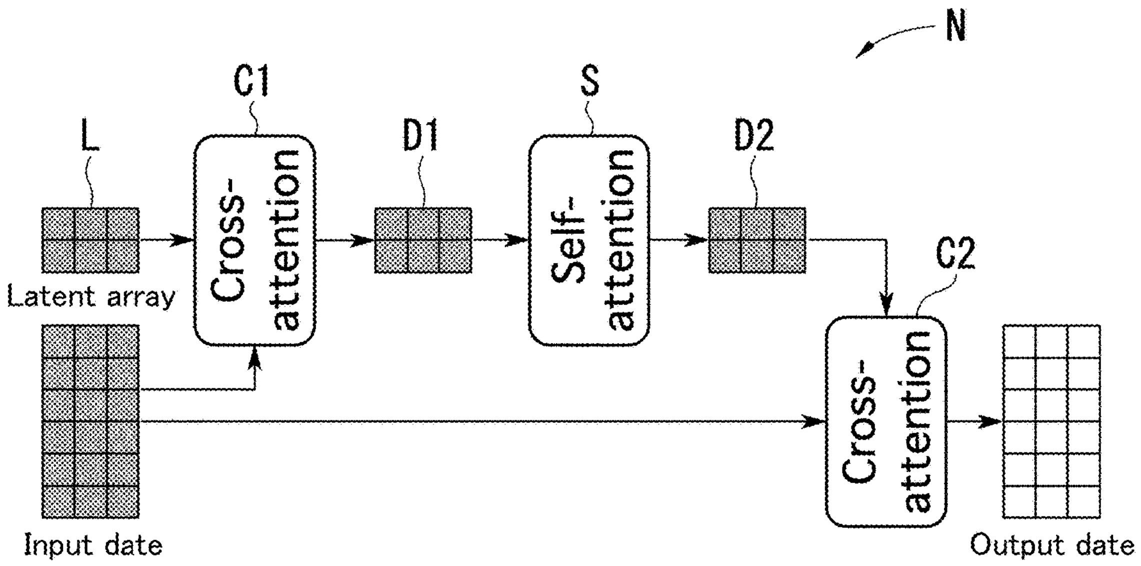
FIG. 4 is a schematic diagram of a machine learning model applied in the position estimation system.

FIG. 4 is a schematic diagram for explaining the machine learning model N applied in the embodiment of the present invention. The machine learning model N has a function of using time-series data measured by the sensor unit 13 of the aerial vehicle 10 as an input value and reconstructing the time-series data based on predetermined weighting coefficients to generate array data. The machine learning model N is composed of an input cross-attention layer C1 as an input layer, a self-attention layer S as an intermediate layer, and an output cross-attention layer C2 as an output layer.

The input cross-attention layer C1 is an input layer in which a publicly known cross-attention mechanism is executed, and functions as an encoder that encodes input data. As described above, the time-series data measured by the sensor unit 13 of the aerial vehicle 10 is input to the input cross-attention layer C1 as an input value. The time-series data is chronologically ordered data obtained by extracting data in a certain time interval using a window function. In the present embodiment, for example, time-series data for 30 minutes can be expressed as matrix data of 18,000×37.

When the time-series data is input to the input cross-attention layer C1, the input cross-attention layer C1 computes interactions in the time-series data based on a latent array L (abstract array data consisting of random numbers embedded with features included in the time-series data) and extracts features of the time-series data. The input cross-attention layer C1 performs learning of the latent array L by repeatedly extracting the time-series data and holding it in the latent array L as necessary. The latent array L is matrix data of 256×128 in the present embodiment, but the size of the latent array L can be appropriately changed.

First array data D1 compressed in a predetermined manner based on the extracted features is then generated. That is, the time-series data consisting of a predetermined byte array is mapped with the latent array L having a smaller number of data points than the byte array, whereby the first array data D1 for which the time-series data is compressed is generated.

The self-attention layer S is an intermediate layer in which a publicly known self-attention mechanism is executed, and more optimally encodes noteworthy data in the first array data D1. Specifically, interactions in the first array data D1 are computed, and weighting coefficients are computed based on the similarity as to which part should have a stronger correlation with which part to obtain the correct output data, and as a weighted average thereof, the optimal solution is derived.

Second array data D2 for which the first array data D1 is optimized is then generated in the self-attention layer S.

Note that in order to estimate the current position of the aerial vehicle 10, it is necessary to compute the travel direction of the aerial vehicle 10 and the flight distance from the starting point. However, as a result of the self-attention, the correlation between the time-series data at the starting point and the end point in the heading direction of the aerial vehicle 10 becomes high in general.

The output cross-attention layer C2 is an output layer in which a publicly known cross-attention mechanism is executed as with the input cross-attention layer C1, and functions as a decoder that outputs the second array data D2 generated in the self-attention layer S as output data of the original size. That is, the output cross-attention layer C2 decodes the second array data D2 in which the features obtained through learning are emphasized to the same size as the time-series data that is the input value.

Note that in the embodiment of the present invention, the cross-attention processing in the input cross-attention layer C1 and the output cross-attention layer C2 is executed once each, and the self-attention processing in the self-attention layer S is executed 12 times.

Note that the number of times of each computation processing is not necessarily limited to the above. In particular, the number of times of processing in the self-attention mechanism for capturing the features in the time-series data can be appropriately changed according to the type and size of the time-series data whose features are to be captured.

The training unit 23 trains the machine learning model using training data. Specifically, the training unit 23 repeatedly updates the weighting coefficients in the machine learning model by, for example, a publicly known error back propagation method such that the difference between the output value of the machine learning model and the actual measured value 41 the output parameter becomes small, using a large amount of training data. As a result, the machine learning model is trained, and a trained machine learning model is generated. Information on the trained machine learning model (the model structure, the weighting coefficients, etc.) is stored in the storage unit 24 in the position estimation system 20 and used as a next and subsequent machine learning model in the estimation unit 22.

Figure 5:
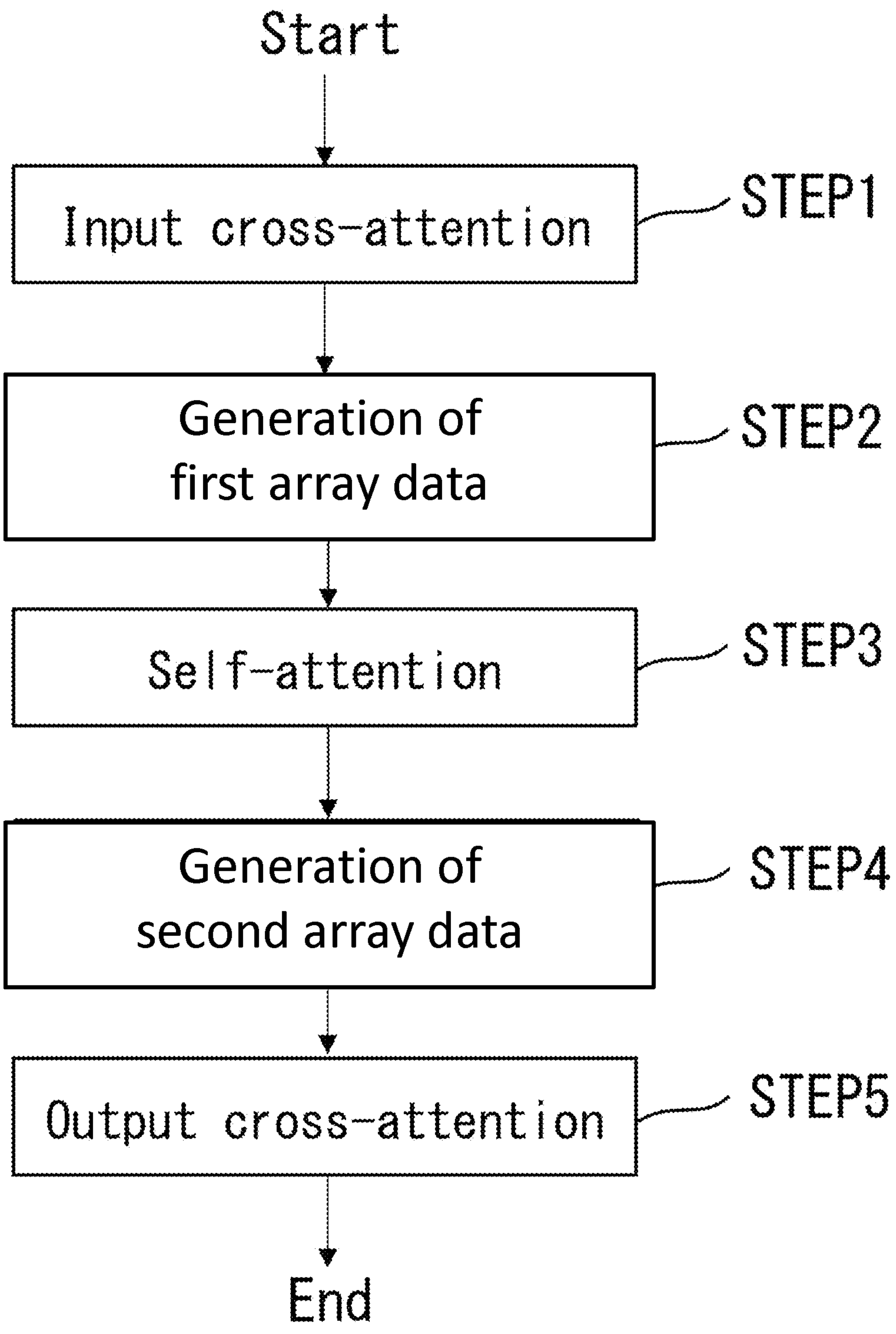
FIG. 5 is a position estimation flow of the aerial vehicle according to the embodiment of the present invention.

Next, a position estimation flow of the aerial vehicle 10 executed by the position estimation system 20 will be described based on FIG. 5.

First, when the position estimation system 20 receives the time-series data obtained by the sensor unit 13 of the aerial vehicle 10, the estimation unit 22 computes the features of the time-series data from the interactions in the time-series data based on the latent array L in the input cross-attention layer C1 (STEP 1), and generates the first array data D1 compressed in a predetermined manner (STEP 2).

Next, the first array data D1 is input to the self-attention layer S, and the self-attention mechanism is executed (STEP 3). In the computation in the self-attention layer, as described above, the interactions in the first array data D1 are computed, the weighting coefficients based on the similarity are computed, and as a weighted average thereof, the optimal solution is derived. The second array data D2 into which the first array data D1 is optimized is then generated (STEP 4).

The second array data D2 generated in STEP 4 is decoded to the same size as the time-series data of the input value in the output cross-attention layer C2 (STEP 5), and the current position of the aerial vehicle 1 is estimated based on the output data.

The current position of the aerial vehicle 10 estimated by the estimation unit 22 is compared with a predetermined flight route, and when the current position of the aerial vehicle 10 is flying along the flight route, no special instructions are given to the aerial vehicle 10 and the flight is continued as it is. On the other hand, when the aerial vehicle 10 deviates from the flight route, a control signal is transmitted to the aerial vehicle 10 so as to return to the flight route. The aerial vehicle 10 having received the control signal can output a control signal from the flight control unit 14 to the power mechanism of the aerial vehicle 10 to autonomously return the aerial vehicle 10 to the flight route.

Next, an example of the present invention will be described. First, FIG. 6(*a*) shows a Python program for autopilot of the aerial vehicle 10. This program indicates that (1) the aerial vehicle ascends five meters after takeoff, (2) the aerial vehicle remains stationary for 10 seconds, and then (3) the aerial vehicle heads west for two seconds at a speed of five meters per second.

Figure 6:
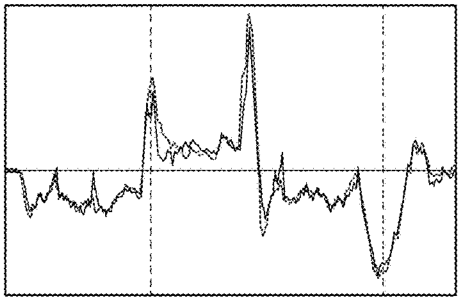
FIG. 6(*a*) is an autopilot program for the aerial vehicle and FIG. 6(*b*) is time-series data obtained by the aerial vehicle in an example of the present invention.

FIG. 6(*b*) is time-series data measured by the aerial vehicle 10 flying according to this program. In the present example, in order to estimate the current position of the aerial vehicle 10, the values of arguments of the autopilot program are inferred from the time-series data by use of Perceiver as the machine learning model. For this purpose, the output is configured such that the machine learning model of FIG. 4 is a multivariate linear regression model.

Figure 7:
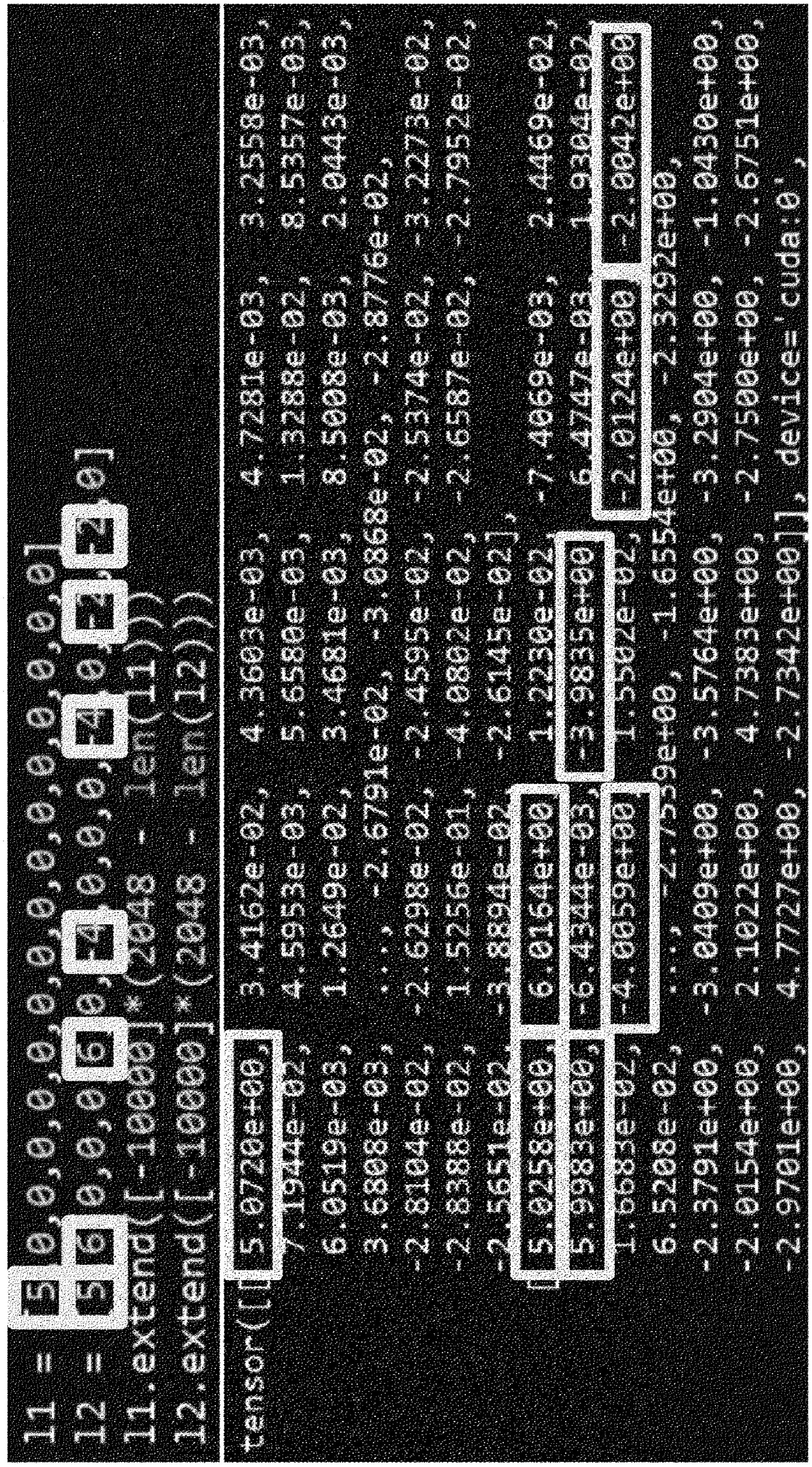
FIG. 7 is a result of outputting an argument of the autopilot program from the time-series data in the example of the present invention.

FIG. 7 is a result of outputting the arguments of the autopilot program from the time-series data using Perceiver code of Hugging Face. Values surrounded by white frames are correct values (top) and calculation results (bottom). It can be seen that the error of the calculation results is several percent.

As described above, in the aerial vehicle position estimation system and the aerial vehicle position estimation method to which the present invention is applied, the accuracy of estimating the current position of the aerial vehicle can be improved, and the aerial vehicle can fly stably for a long time.

DESCRIPTION OF REFERENCE SIGNS

10 Aerial vehicle
11 Communication unit
12 Data processing unit
13 Sensor unit
131 Roll sensor
132 Pitch sensor
133 Yaw sensor
134 Altitude sensor
14 Flight control unit
20 Position estimation system
21 Communication unit
22 Estimation unit
23 Training unit
24 Storage unit
30 LPWA gateway
40 Network
N Machine learning model
D1 First array data
D2 Second array data
L Latent array
C1 Input cross-attention layer
C2 Output cross-attention layer
S Self-attention layer

What is claimed is:

1. An aerial vehicle position estimation system comprising:

a communication unit capable of receiving time-series data related to an aerial vehicle flying in a predetermined route by wireless communication; and an estimation unit including a processor and a memory storing instructions which, when executed by the processor, cause the estimation unit to estimate a current flight position of the aerial vehicle by executing a predetermined machine learning algorithm using the time-series data received by the communication unit as an input value, wherein the time-series data is transmitted from the aerial vehicle and is composed of one or more variables selected from a roll angle, a pitch angle, a yaw angle, and a throttle amount of the aerial vehicle, and the time-series data is a byte array in which the variables are arranged in chronological order, and the machine learning algorithm performs:

in an input layer, generating first array data by extracting features of the time-series data through mapping the time-series data received from the communication unit with a latent array, the first array data having a smaller data size than the time-series data so as to reduce computational load and memory amount of the machine learning algorithm;

in an intermediate layer, computing interactions in the first array data, computing weighting coefficients based on similarity between data, and generating second array data by reconstructing the first array data based on the weighting coefficients;

in an output layer, decoding the second array data so as to have a same size as the time-series data, and outputting decoded data; and calculating the current flight position of the aerial vehicle from the decoded data.

2. The aerial vehicle position estimation system according to claim 1, wherein the input layer and the output layer each execute cross-attention processing using a cross-attention mechanism once, and the intermediate layer executes self-attention processing using a self-attention mechanism a plurality of times.

3. The aerial vehicle position estimation system according to claim 1, wherein the wireless communication is a low power wide area (LPWA) system.

4. The aerial vehicle position estimation system according to claim 1, wherein the latent array is composed of random numbers, the first array data embeds features of the time-series data, and the second array data embeds a similarity between the features of the time-series data.

5. The aerial vehicle position estimation system according to claim 1, wherein the aerial vehicle does not include a GPS device configured to measure position data using a global positioning system (GPS).

6. The aerial vehicle position estimation system according to claim 1, further comprising:

a training unit configured to update the weighting coefficients of the machine learning algorithm, each time the current flight position of the aerial vehicle is calculated using the machine learning algorithm, by calculating a difference between the decoded data and preset setting values so as to reduce the difference.

7. An aerial vehicle position estimation method comprising the steps of:

receiving time-series data related to an aerial vehicle flying in a predetermined route by wireless communication; and estimating a current position of the aerial vehicle by executing a predetermined machine learning algorithm using the received time-series data as an input value, wherein the time-series data is composed of one or more variables selected from a roll angle, a pitch angle, a yaw angle, and a throttle amount of the aerial vehicle, and the time-series data is a byte array in which the variables are arranged in chronological order, and the machine learning algorithm includes:

generating first array data by extracting features of the time-series data through mapping the time-series data received with a latent array, the first array data having a smaller data size than the time-series data so as to reduce computational load and memory amount of the machine learning algorithm;

computing interactions in the first array data, computing weighting coefficients based on similarity between data, and generating second array data by reconstructing the first array data based on the weighting coefficients;

decoding the second array data so as to have a same size as the time-series data, and outputting decoded data; and calculating the current flight position of the aerial vehicle from the decoded data.

8. The aerial vehicle position estimation method according to claim 7, wherein in each of the step of generating the first array data and the step of decoding the second array data into the output value, cross-attention processing using a cross-attention mechanism is executed once, and in the step of generating the second array data, self-attention processing using a self-attention mechanism is executed a plurality of times.

9. The aerial vehicle position estimation method according to claim 7, wherein the latent array used for mapping the time-series data has a smaller number of data points than the byte array.

10. The aerial vehicle position estimation method according to claim 7, further comprising a step of comparing a current position of the aerial vehicle with a predetermined flight route, and controlling the aerial vehicle by autonomous control or an external control signal so as to return to the flight route when the current position of the aerial vehicle deviates from the flight route.

* * * * *